United States Patent
Mocko et al.

(10) Patent No.: US 9,836,732 B1
(45) Date of Patent: Dec. 5, 2017

(54) PAYMENT HANDLING (71) Applicant: Square, Inc., San Francisco, CA (US)

(72) Inventors: Christopher Lang Mocko, San Francisco, CA (US); Michael Wells White, San Francisco, CA (US); John LaBanca, Jr., Dunwoody, GA (US); Bruce Bell, New York, NY (US); Jared Travis Marr, Brooklyn, NY (US)

(73) Assignee: Square, Inc., San Francisco, CA (US)

( * ) Notice: Subject to any disclaimer, the term of this patent is extended or adjusted under 35 U.S.C. 154(b) by 427 days.

(21) Appl. No.: 14/553,704

(22) Filed: Nov. 25, 2014

(51) Int. Cl.
*G06Q 20/00* (2012.01)
*G06Q 20/20* (2012.01)
*G07G 1/14* (2006.01)
*G07G 1/00* (2006.01)
*G06Q 20/32* (2012.01)

(52) U.S. Cl.
CPC ......... *G06Q 20/204* (2013.01); *G06Q 20/322* (2013.01); *G07G 1/0009* (2013.01); *G07G 1/14* (2013.01)

(58) Field of Classification Search
CPC .................................................. G06Q 20/204
USPC ................................ 705/17, 26.8, 34, 39, 40
See application file for complete search history.

(56) References Cited

U.S. PATENT DOCUMENTS

| | | | |
|---|---|---|---|
| 2005/0071232 A1* | 3/2005 | Frater | G06Q 20/04 705/16 |
| 2009/0055276 A1* | 2/2009 | Dunsmore | G06Q 20/102 705/15 |
| 2011/0313871 A1* | 12/2011 | Greenwood | G06Q 20/10 705/16 |
| 2014/0207683 A1* | 7/2014 | Bailey | G06Q 20/20 705/44 |

\* cited by examiner

*Primary Examiner* — Hunter Wilder
(74) *Attorney, Agent, or Firm* — Lee & Hayes, PLLC (57) ABSTRACT

A payment handling system may operate to handle payments for the cost of a transaction. The payment handling system may receive first information associated with a first payment instrument, receive second information associated with a second payment instrument, and cause a display to update the UI to indicate that an unallocated portion of the cost of the transaction is to be approximately split between the first payment instrument and the second payment instrument.

20 Claims, 5 Drawing Sheets

PAYMENT HANDLING

BACKGROUND

In today's commerce, merchants often utilize an array of different point-of-sale (POS) devices, including mobile POS devices. Merchants may use these mobile POS devices to engage in transactions with customers at different locations. For instance, a taxi driver may use a mobile POS device to charge a passenger for a taxi ride. In another example, a street vendor may use a mobile POS device to charge a customer for an item purchased from the street vendor.

In some instances, the customers may wish to pay for items together. For example, two passengers of the taxi may wish to divide the fare or a group of customers of a street vendor may wish to divide the check for an order. In such instances, the merchant may have to perform multiple transactions and manually split the total in various ways. This may cause errors, delay, and inconvenience.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

This disclosure describes systems and processes for handling payments among customers and merchants. In some examples herein, the system may provide bill splitting operations for payment processing. For instance, the techniques herein may provide for handling the splitting of the cost of a transaction among one or more payment instruments. Some implementations of the systems and processes described herein may eliminate or reduce computation or complexities associated with bill splitting for merchants.

In some implementations, the merchant may input payment instruments to a merchant device of the merchant (e.g. swipe one or more credit cards) and the bill splitting operations described herein may automatically split a cost of a transaction between the payment instruments without the merchant having to specifically allocate amounts to the instruments. On the other hand, the merchant may make adjustments to the bill splitting arrangement (e.g. in response to a customer asking for a payment instrument to be charged twenty dollars instead of an even share of the bill).

Additional details and scenarios are described below. This brief introduction is provided for the reader's convenience and is not intended to limit the scope of the claims. Furthermore, the techniques described above and below may be implemented in a number of ways and in a number of contexts. Several example implementations and contexts are provided with reference to the following figures, as described below in more detail. However, the following implementations and contexts are but a few of many. For example, though discussed herein in the context of a payment handling system, implementations are not so limited.

Figure 1:
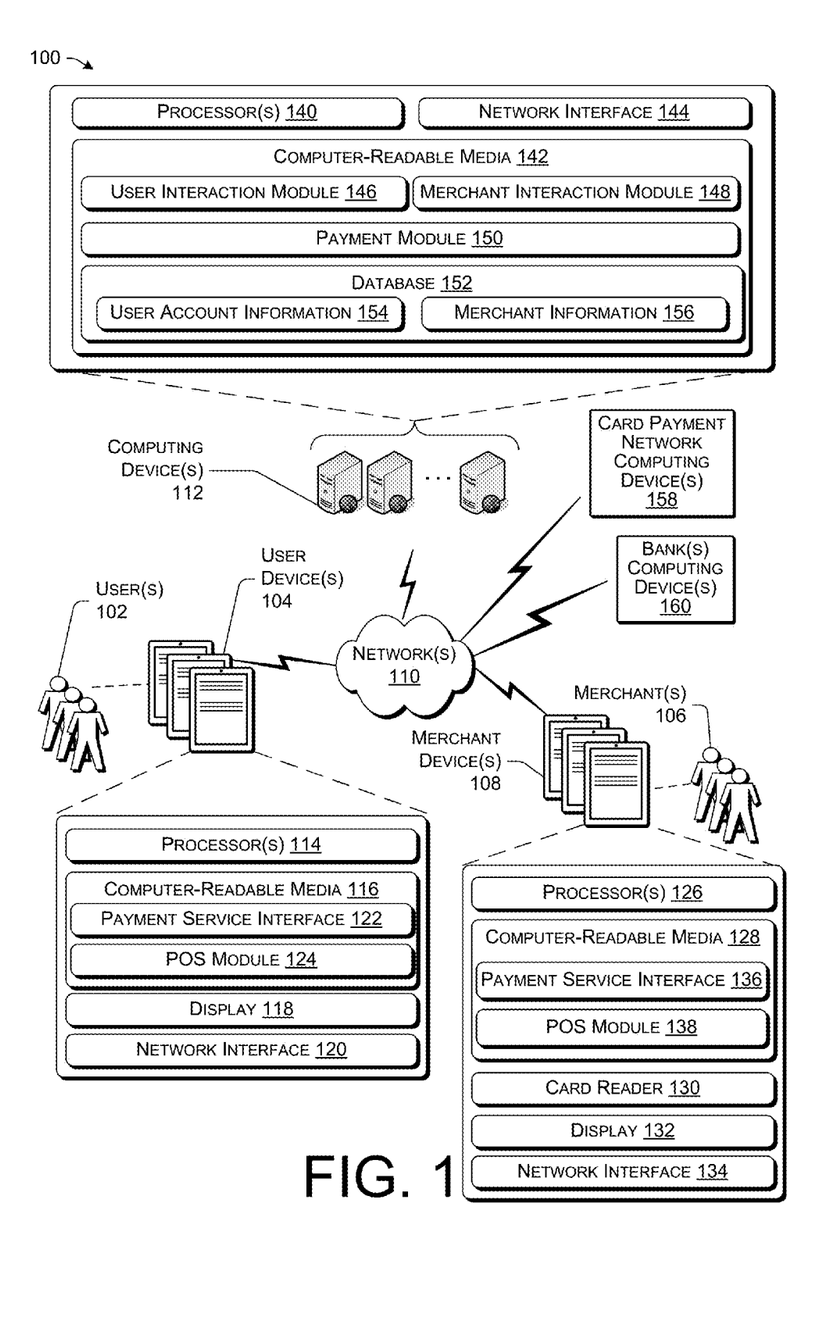
FIG. 1 illustrates an example system for handling payments among customers and merchants.

FIG. 1 illustrates an example system 100 for handling bill splitting operations when processing payments among customers and merchants. More particularly, FIG. 1 provides a framework for payments from customers to merchants in which bill splitting operations may occur. Such payments may be made in various ways, such as by point of sale or by using a payment service. Additional details of bill splitting operations are provided with respect to FIGS. 3A-4.

As shown in FIG. 1, the system 100 may include one or more user(s) 102 (e.g. customers), one or more user device(s) 104 associated with the user(s) 102, one or more merchants 106, one or more merchant devices 108 associated with the one or more merchants 106, one or more network(s) 110, and one or more computing device(s) 112. In various implementations, the user(s) 102 may operate the user device(s) 104, which may include one or more processor(s) 114, computer-readable media 116, a display 118 and a network interface. The computer-readable media 116 may store a payment service interface 122 and a POS module 124. Similarly, the merchant(s) 106 may operate the merchant device(s) 108, which may include one or more processor(s) 126, computer-readable media 128, a card reader 130, a display 132 and a network interface 134. The computer-readable media 126 may store a payment service interface 136 and a POS module 138. The computing device(s) 112 may also include one or more processor(s) 140, computer-readable media 142 and a network interface 144. The computer readable media 142 may store a user interaction module 146, a merchant interaction module 148, a payment module 150 and a database 152.

In some implementations, one of the users 102 may operate a user device 104 to perform various functions associated with the user device 104. For example, a user of the user(s) 102 may utilize the user device 104, and particularly the payment service interface 122 thereof, to interact with the computing devices 112 via the network interface 120 to establish a user account with the payment service of the computing devices 112. In addition, a user of the user(s) 102 may utilize POS module 124 of the user device 104 to interface with the POS module 138 of the merchant device(s) 108, e.g. as part of a transaction using the payment service of the computing devices 112. For example, the user device 104 may communicate via the network interface 120 with the merchant device(s) 108 and the network interface 134. As an example of such a payment operation, the POS module 138 of the merchant device 108 may communicate with the POS module 124 of the user device 104 to obtain information for processing a payment from the user 102 to the merchant 106 using the payment service of the computing devices 112.

In some implementations, the user device 104 may be any type of device that is capable of interacting with the merchant device(s) 108 and/or the computing device(s) 112. For instance, the user device 104 may include a personal computer, a laptop computer, a cellular telephone, a PDA, a tablet device, or any other device. The user device 104 shown in FIG. 1 is only one example of a user device 104 and is not intended to suggest any limitation as to the scope of use or functionality of any user device 104 utilized to perform the processes and/or procedures described herein. For example, the user device 104 may include various other applications or modules, such as for a user dashboard to enable the user to control information in a user's profile, set user preferences, and so forth.

The processor(s) 114 of the user device 104 may execute one or more modules and/or processes to cause the user device 104 to perform a variety of functions, as set forth above and explained in further detail in the following disclosure. In some implementations, the processor(s) 114 may include a central processing unit (CPU), a graphics processing unit (GPU), both CPU and GPU, or other processing units or components known in the art. Additionally, each of the processor(s) 114 may possess its own local memory, which also may store program modules, program data, and/or one or more operating systems.

Depending on the exact configuration and type of the user device 104, the computer-readable media 116 may include volatile memory (such as RAM), non-volatile memory (such as ROM, flash memory, miniature hard drive, memory card, or the like), or some combination thereof.

In various implementations, the user device 104 may also have input device(s) such as a keyboard, a mouse, a pen, a voice input device, a touch input device, etc. The user device 104 may also include the display 118 and other output device(s), such as speakers, a printer, etc. The user 102 may utilize the foregoing features to interact with the user device 104, merchant device(s) 108 or the computing device(s) 112 via the network(s) 110. More particularly, the display 118 of the user device 104 may include any type of display 118 known in the art that is configured to present (e.g., display) information to the users 102.

In various implementations, the one or more merchants 106 may be any individual, entity, or machine that offers products, services or the like according to the examples herein. Moreover, each of the merchants 106 may be associated with one or more merchant devices 108, which may be the same as, similar to, or different from the user devices 104. The merchant devices 108 may include any number of components such as the one or more processor(s) 126, the computer-readable media 128, the card reader 130, the display 132 and/or network interface 134. The merchants 106 may utilize the merchant devices 108 to interact with the user device(s) 104 and/or computing device(s) 112 in any manner. For instance, the merchant devices 108 may be used to access an interface associated with the computing device(s) 112 (e.g. the payment service interface 136). Continuing the above example, a merchant device 108 may utilize information obtained from interacting with the POS module 124 of the user device 104 to execute the payment from the user 102 to the merchant 106 through the payment service of the computing devices 112. Further, the POS module 138 may control the operation of the card reader 130 to read payment information from credit cards, debit cards, gift cards and the like. The POS module 138 may then utilize the information in operations for allocating portions of a transaction cost between a plurality of payment instruments. Moreover, the POS module 138 may operate to interact with the card payment network computing devices(s) 158 and/or bank(s) computing device(s) 160 to execute payments from the user 102 to the merchant 106.

While the user devices 104 and merchant devices 108 are shown as including different modules, this is merely for ease of illustration and not intended as limiting. In various implementations, the user devices 104 and merchant devices 108 may be identical, similar or distinct. Moreover, the modules shown and described for the user devices 104 and merchant devices 108 may be implemented as more modules or as fewer modules and functions described for the modules may be redistributed depending on the details of the implementation. Further, in some implementations, the user devices 104 and/or merchant devices 108 may vary from device to device. In general, the user devices 104 and the merchant devices 108 can each be any appropriate device operable to send and receive requests, messages, or other types of information over the one or more networks 110 or directly to each other. Additionally, in some implementation, there may be thousands, hundreds of thousands, or more, of the user devices 104 and the merchant devices 108.

In some implementations, the network(s) 110 may be any type of network known in the art, such as a local area network or a wide area network, such as the Internet, and may include a wireless network, such as a cellular network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks 110 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Consequently, the user devices 104, the merchant devices 108, and the computing device(s) 112 may communicatively couple to the network(s) 110 in any manner, such as by a wired or wireless connection. The network(s) 110 may also facilitate communication between the user devices 104, the merchant devices 108, and the computing device(s) 112. In turn, the network interfaces 120, 134 and 144 of the user devices 104, the merchant devices 108, and the computing device(s) 112 may be any network interface hardware components that may allow user devices 104, the merchant devices 108, and the computing device(s) 112 communicate over the network(s) 110. For example, in a particular implementation, the network interfaces 120 and 134 of the user devices 104 and merchant devices 108 may include near field communication capabilities for performing the communications there between involved in POS operations.

In addition, and as mentioned previously, the computing device(s) 112 may include the one or more processor(s) 140, the computer-readable media 142 and network interface 144. The computing device(s) 112 may also include additional components not listed above that may perform any function associated with the computing device(s) 112. In various implementations, the computing device(s) 112 may be any type of computing device, such as a network-accessible server, and may be one of multiple servers included in a server cluster or server farm. In other implementations, the processor(s) 140 and the computer-readable media 142 of the computing device(s) 112 may be the same as, similar to, or different from the processor(s) 114 and the computer-readable media 116, respectively, of the user device(s) 104. As discussed above, the computer-readable media 142 may store the user interaction module 146, the merchant interaction module 148, the payment module 150 and the database 152. The database 152 may store various information including user account information 154 and merchant information 156.

The user interaction module 146 and merchant interaction module 148 operate to interface with the user devices 104 and merchant devices 108, respectively. For example, the modules 146 and 148 may operate in accordance with instructions from the payment module 150 to request or provide information on behalf of the payment module 150. The payment module 150 may handle the processing of payments. For example, the payment module 150 may utilize the user interaction module 146 and the merchant interaction module 148 to handle communication with the user 102 and merchant 106, respectively. In addition, the payment module 150 may utilize information from the database 152, such as the user account information 154 and merchant information 156 to provide handling of payments between merchants and users. In some implementations, user account information 154 may include information regarding electronic payment accounts of the customers (e.g. users 102).

As mentioned above, the payment module 150 may handle payments between merchants and users. When paying for a transaction, a user 102 can provide the amount of payment that is due to a merchant 106 using cash, check, a payment card, NFC, or by electronic payment through a payment service of the computing devices 112. The merchant 106 can interact with the merchant device 108 to process the transaction. In some examples, the service of the computing device 112 may handle some payments while other payments may at least at times be handled by point of sale (POS) transactions. In such cases, the point of sale may be the place where the user 102 with user device 104 interacts with the merchant 106 with merchant device 108 and executes a transaction (e.g. purchases items from a street vendor merchant or a restaurant merchant). During point-of-sale (POS) transactions, the merchant device 108 can determine and send data describing the transactions, including, for example, services provided, item(s) being purchased, the amount of the services or item(s), buyer information, and so forth.

In some implementations, the payment service enables card-less payments, i.e., electronic payments, for transactions between the users 102 and the merchants 106 based on interaction of the user 102 with the user device 104 and interaction of the merchant 106 with the merchant device 108. Accordingly, in some examples, a card-less payment transaction may include a transaction conducted between a user 102 and a merchant 106 at a POS location during which an electronic payment account of the user 102 is charged without the user 102 having to physically present a payment card to the merchant 106 at the POS location. Consequently, the merchant 106 need not receive any details about the financial account of the user 102 for the transaction to be processed. As one example, the electronic payment may be charged to a credit card issuer or credit card number that the user 102 provided when signing up with the service of the computing devices 112 for an electronic payment account. As another example, the user 102 may have a quantity of money pre-paid in an account maintained for use in making the electronic payments. Other variations will also be apparent to those of skill in the art having the benefit of the disclosure herein.

Before conducting an electronic payment transaction, the user 102 typically creates a user account with the service of the computing devices 112. The user 102 can create the user account, for example, by interacting with an application of the user device 104 that is configured to perform electronic payment transactions and that may execute on the user device 104 (e.g. the payment service interface 122). When creating an electronic payment account with the service of the computing devices 112, the user 102 may provide an image including the face of the user, data describing a financial account of the user 102 (e.g., a credit card number, expiration date), and a billing address. This user information can be securely stored by the computing devices 112, for example, in the user account information 154 in the database 152. Further, the user account information 154 may be created for each user 102, which may include information about the user and transactions conducted by the user.

To accept electronic payments for POS transactions, the merchant 106 may create a merchant account with the service of the computing devices 112 by providing information describing the merchant including, for example, a merchant name, contact information, e.g., telephone numbers, the merchant's geographic location address, and one or more financial accounts to which funds collected from users will be deposited. This merchant information 156 can be securely stored by the service, for example, in the database 154 along with the user account information 154. Further, a merchant profile may be created for each merchant, which may include information about the merchant and transactions conducted by the merchant.

The service of the computing devices 112 may be configured to enable electronic payments for transactions. The computing devices 112 can include one or more servers that are configured to perform securely electronic financial transactions, e.g., electronic payments for transactions between a user and a merchant, for example, through data communicated between the user device 104 and the merchant device 108. Generally, when a user and a merchant enter into an electronic payment transaction, the transaction is processed by electronically transferring funds from a financial account associated with the user account to a financial account associated with the merchant account.

The payment module 150 may be configured to send and receive data to and from the user device 104 and the merchant device 108. For example, the payment module 150 can be configured to send information describing merchants to an application on the user device 104 using, for example, the information stored in the database 152. For example, the payment module 150 can communicate data describing merchants 106 that are within a threshold geographic distance from a geographic location of the user device 104. The data describing the merchants 106 can include, for example, a merchant name, geographic location, contact information, and an electronic catalogue, e.g., a menu that describes items that are available from the merchant.

In some embodiments, the payment module 150 is configured to determine whether a geographic location of the user device 104 is within a threshold geographic distance from a geographic location of the merchant device 108. The payment module 150 can determine a geographic location of the user device 104 using, for example, geolocation data provided by the user device 104. Similarly, the payment module 150 can determine a geographic location of the merchant device 108 using, for example, geolocation data provided by the merchant device 108 or using a geographic address, e.g., street address, provided by the merchant. Depending on the implementation, the threshold geographic distance can be specified by the payment module 150, by the user, or by the merchant.

Determining whether the user device 104 is within a threshold geographic distance of the merchant device 108 can be accomplished in different ways including, for example, determining whether the user device 104 is within a threshold geographic radius of the merchant device 108, determining whether the user device 104 is within a particular geofence, or determining whether the user device 104 can communicate with the merchant device 108 using a specified wireless technology, e.g., Bluetooth® or Bluetooth® low energy (BLE). In some embodiments, the payment module 150 restricts electronic payment transactions between the user 102 and the merchant 106 to situations where the geographic location of the user device 104 is within a threshold geographic distance from a geographic location of the merchant device 108.

The computing devices 112 can also be configured to communicate with one or more computing devices 158 of a card payment network (e.g., MasterCard®, VISA®) over the one or more networks 110 to conduct financial transactions electronically. The computing devices 112 can also communicate with one or more bank computing devices 158 of one or more banks over the one or more networks 110. For example, the computing devices 112 may communicate with an acquiring bank, and/or an issuing bank, and/or a bank maintaining user accounts for electronic payments.

An acquiring bank may be a registered member of a card association (e.g., Visa®, MasterCard®), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the user may use a debit card or gift card instead of a credit card, in which case, the bank computing device(s) of a bank or other institution corresponding to the debit card or gift card may receive communications regarding a transaction in which the user is participating. Additionally, there may be computing devices of other financial institutions involved in some types of transactions or in alternative system architectures, and thus, the foregoing are merely several examples for discussion purposes. In addition, the merchant device(s) 108 may perform interactions similar to those described above with regard to the computing devices 152 of a card payment network and the bank computing devices 158 when processing transactions for payment instruments that do not involve the payment service of the computing devices 112.

The user 102 operating the user device 104 that is within a threshold geographic distance of the merchant device 108 can interact with an application executed on the user device 104 to conduct an electronic payment transaction with the merchant 106. While interacting with the application, the user 102 can select the merchant 106, from a listing of merchants 106, with whom the user wants to enter into an electronic payment transaction. The user 102 can select the merchant 106, for example, by selecting a "check in" option associated with the merchant 106. The user device 104 can communicate data to the computing devices 112 indicating that the user 102 has checked in with the merchant 106. In response, the computing devices 112 can communicate data to notify the merchant device 106 that the user has checked in. An application executing on the merchant device 108 can notify the merchant 106 that the user has electronically checked in with the merchant 106 through a display of the merchant device 108.

Once checked in, the user 102 can receive, obtain or request items, services or appointments that are available to be acquired from the merchant 106. When the user 102 is ready to enter into the card-less payment transaction, the user 102 can, for example, approach a point of sale for the merchant 106 and identify him or herself. For example, the user 102 can verbally notify the merchant 106 that the user 102 wants to enter into a card-less payment transaction and can provide the merchant 106 with the user's name. The merchant 106 can then interact with the application executing on the merchant's device to select the user 102, from a listing of users that have checked in with the merchant 106, to initiate an electronic payment transaction for the item(s) being acquired by the user 102. For example, the merchant 106 can determine a total amount to charge the user for the item(s) being acquired. The user can verbally approve the total amount to be paid and, in response, the merchant 106 can submit a request for an electronic payment transaction for the total amount of the transaction to the computing devices 112. In response, the computing devices 112 can obtain, for example, from the user account information 154, data describing a financial account associated with the electronic purchase account of the user 102 to which the total amount will be charged.

The computing devices 112 can then communicate with the computing device 158 of a card payment network to complete an electronic payment transaction for the total amount to be charged to user's electronic payment account. Once the electronic payment transaction is complete, the computing devices 112 can communicate data describing the electronic payment for the transaction to the user device 104, e.g., as an electronic receipt, which can, for example, notify the user 102 of the total amount charged to the user for the electronic payment for the transaction with the particular merchant. Further, while a mobile user device 104 is described in this example for purposes of explanation, additional or alternative types of devices may be used in other examples.

As mentioned above, the operations of modules 122-124, 136-138 and 146-152 may vary depending on functionality provided by the particular implementation. As such, the implementations are not limited to the example provided above. Additional details and example functionalities of the user device(s) 104, merchant device(s) 108 and the computing devices 112 as a whole are discussed below with regard to FIGS. 2-4.

Figure 2:
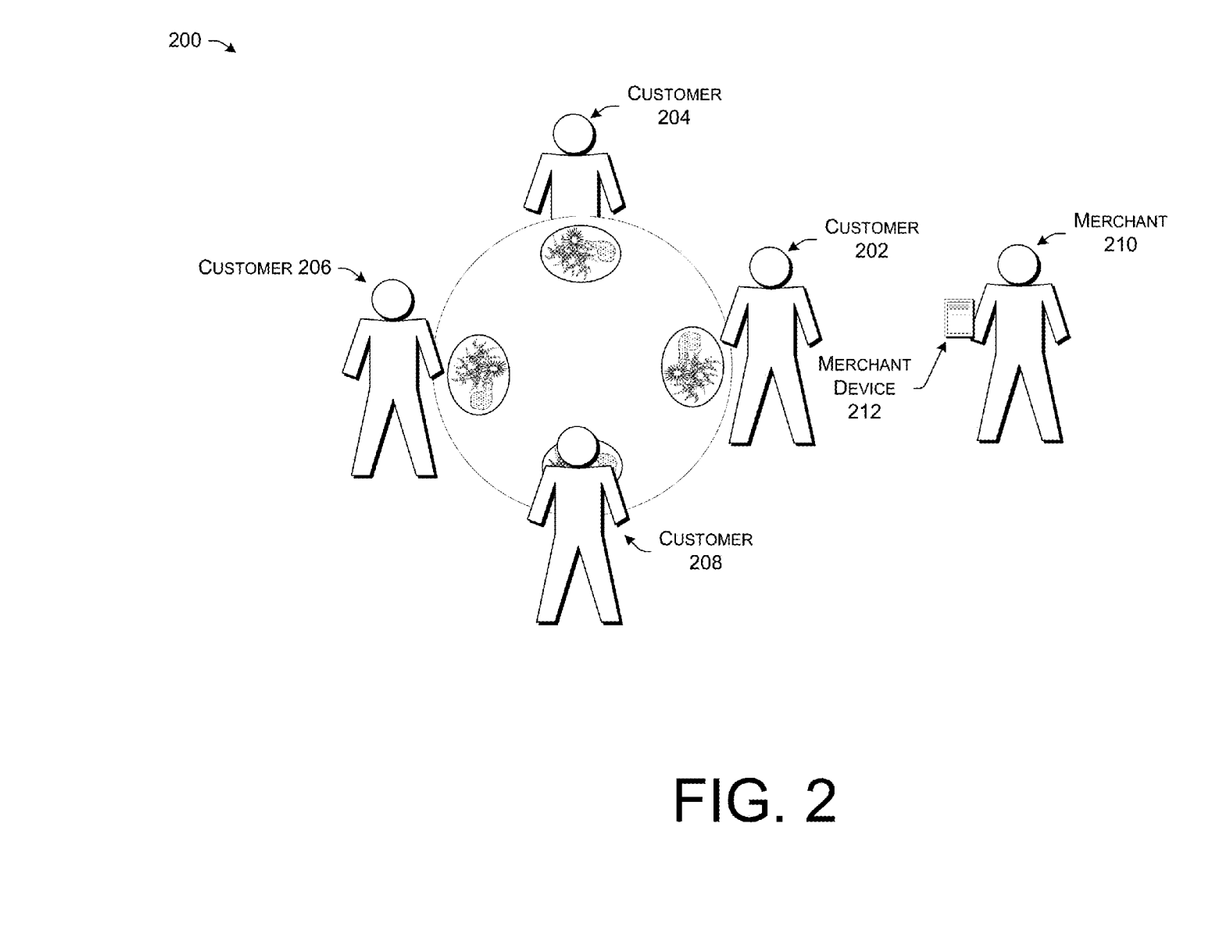
FIG. 2 is an example illustration of a scenario that provides context for FIGS. 3A, 3B and 4.
Figure 3A:
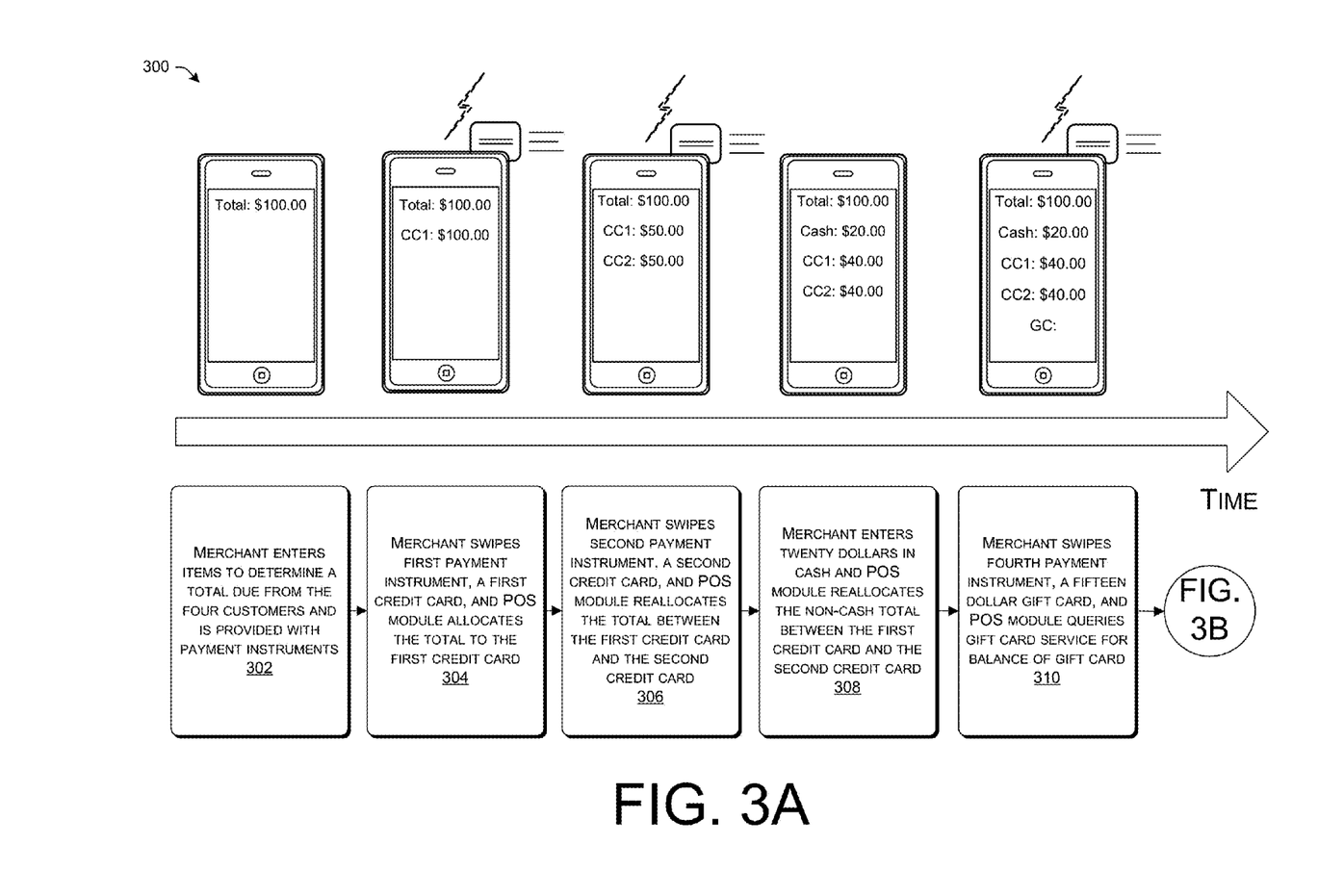
FIGS. 3A-3B are sequence diagrams illustrating the operations of bill splitting in a particular transaction executed by the system shown in FIG. 1.
Figure 3B:
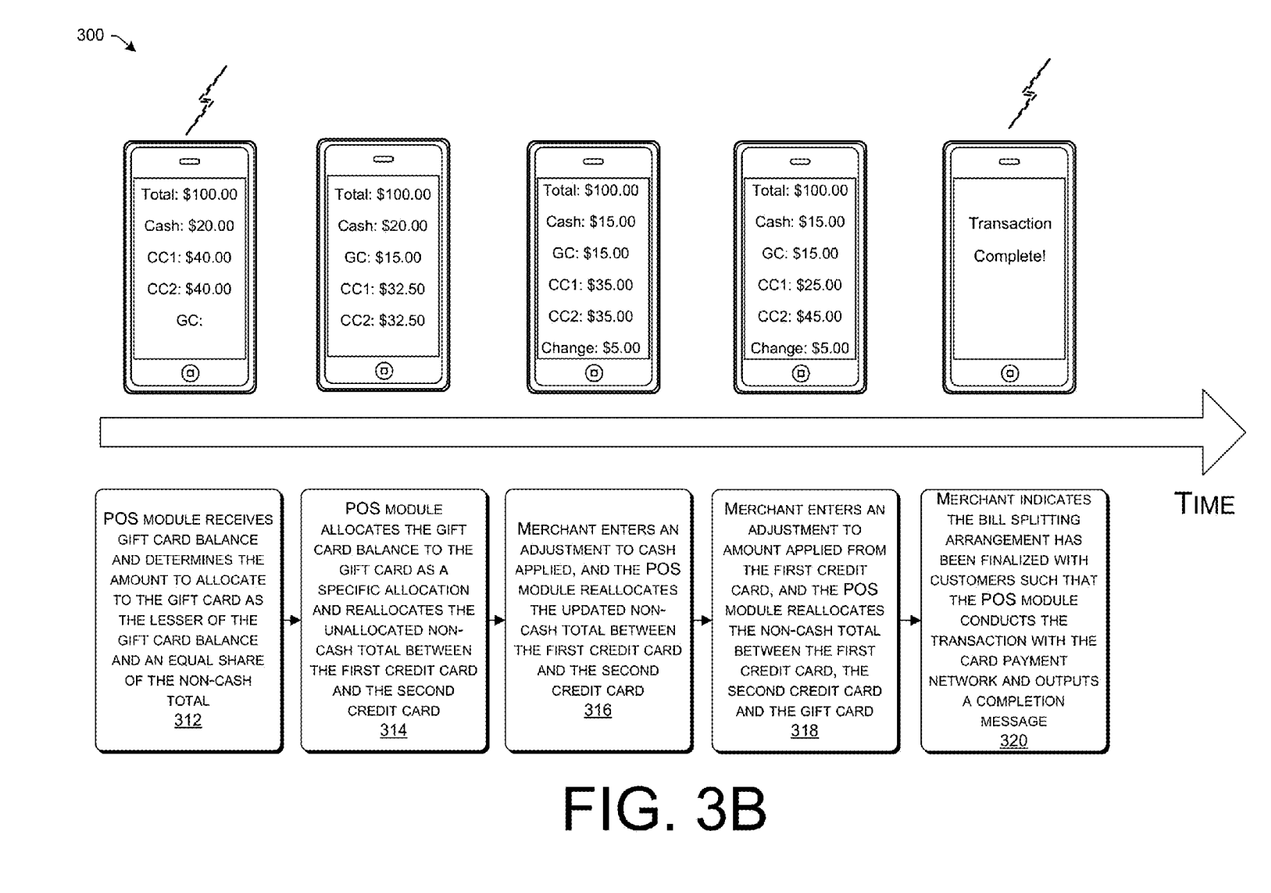
Figure 4:
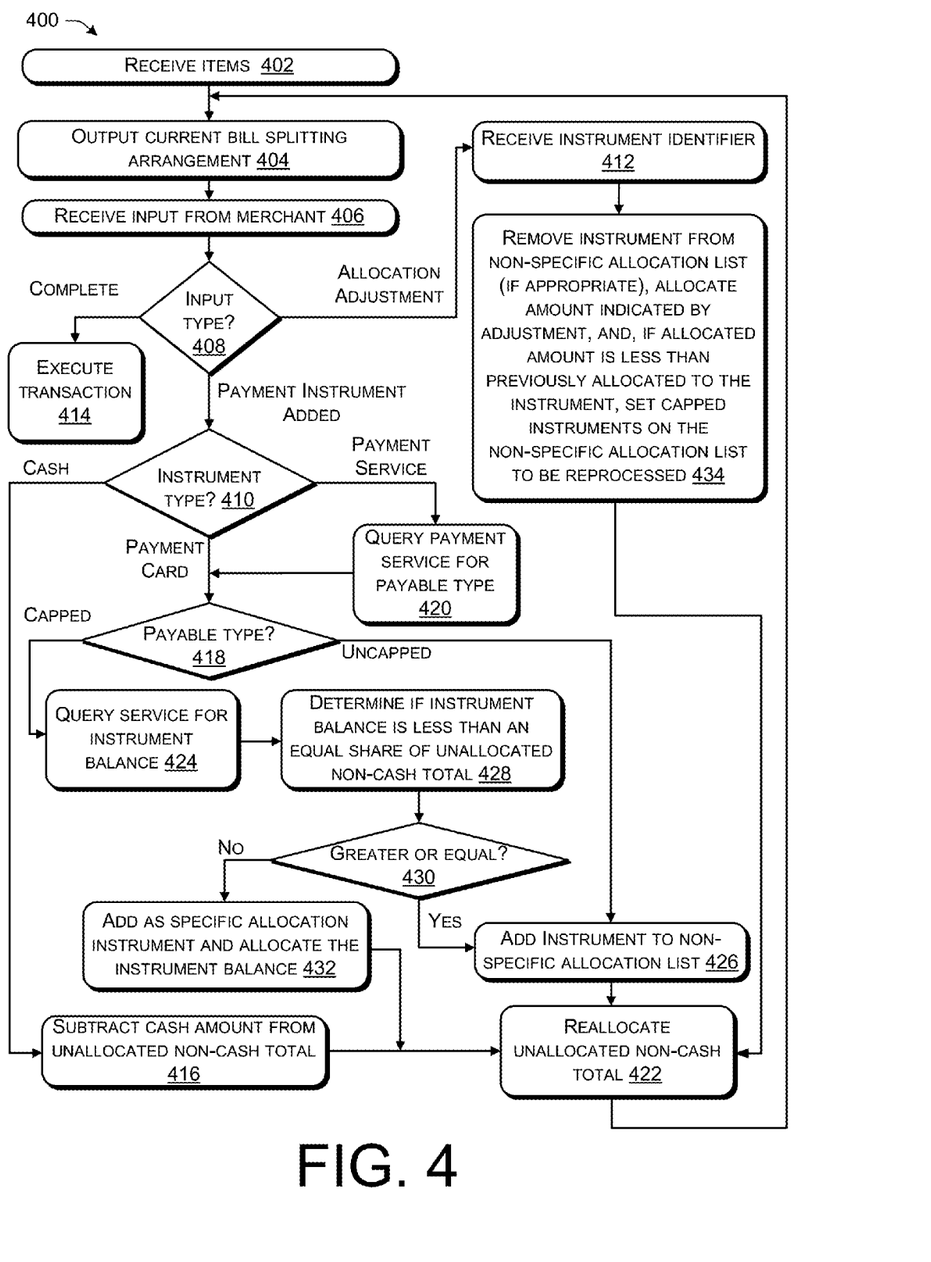
FIG. 4 is a flow diagram illustrating an example process for handling bill splitting operations in the system shown in FIG. 1 and as discuss with regard to FIGS. 2-3B.

FIG. 2 is an example illustration that provides context for the discussion of various scenarios with respect to FIGS. 3A-4. In particular, FIG. 2 is an illustration of a scenario occurring at a restaurant 200 in which bill splitting operations may be performed. In general, the scenario is as follows.

Customers 202-208 are at the restaurant 200. A merchant 210 (e.g. a member of the service personnel of the restaurant) is serving the customers 202-208 at the restaurant 200. The merchant 210 takes customer orders for items using a merchant device 212. Subsequent to providing the items, the merchant 210 receives a plurality of payment instruments from the customers 202-208 which may include various combinations of payment cards, cash, and electronic payment information for use with the payment service of the computing device(s) 112, and so on. The merchant device 212 is provided with these the payment instruments, for example, by the merchant 210 swiping the payment cards, inputting the information regarding cash payments, communication with one or more user device(s) 104 of the customers 202-208 (e.g. via NFC) and so on. Bill splitting operations are performed by the merchant device 212 between the various payment instruments in the manner described below with regard to FIGS. 3A-4. While or after providing the payment instruments to the merchant device 212, the merchant 210 may provide adjustment information to the merchant device 212 to change the bill splitting between the payment instruments. The merchant device 212 may then execute the transactions for the payment instruments based on the bill splitting arrangement.

In view of this general description of the scenario illustrated in FIG. 2, various techniques for performing the associated tasks for bill splitting will be discussed with regard to FIGS. 3A-4.

The example processes are described in the context of the environment of FIG. 1 but are not limited to those environments. Each process described in this disclosure is illustrated as a logical flow graph, each operation of which represents a sequence of operations that can be implemented in hardware, software, or a combination thereof. In the context of software, the operations represent computer-executable instructions stored on one or more computer-readable media or embodied as one or more computer transmission media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In some implementations, the computer transmission media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

FIGS. 3A-3B collectively illustrate a sequence diagrams illustrating the operations of bill splitting in a particular transaction executed by a merchant device in a point-of-sale (POS) context. The process of FIGS. 3A-3B is discussed in the context of the scenario of FIG. 2 described above. However, this is merely to aid in comprehension and the process may be utilized in many other contexts.

At 302, the merchant 210 enters items purchased by the customers into the merchant device 212 and the POS module 138 determines the total due from the customers 202-208 (i.e. $100.00). At this point in the process, no specific allocation of the total due has been made and no cash value has been entered so the total due may be considered as the unallocated non-cash total due. As such, the user interface of the merchant device 212 is shown as indicating a total of $100.00 due with no bill splitting arrangement yet determined.

At 304, the merchant 210 swipes a first payment instrument, a first credit card, and the POS module 138 allocates the unallocated non-cash total due to the first credit card. In particular, the user interface of the merchant device 212 is updated to show that the total due ($100.00) is to be charged to the first credit card (i.e. CC1) if the transaction is executed with no further input.

At 306, the merchant 210 swipes a second payment instrument, a second credit card, and the POS module 138 reallocates the unallocated non-cash total (i.e. $100.00) between the first credit card and the second credit card equally. As such, the user interface of the merchant device 212 is updated to show that, if the transaction is executed with no further input, half the total due ($50.00) is to be charged to the first credit card (i.e. CC1) and to the second credit card (i.e. CC2).

At 308, the merchant 210 indicates the receipt of twenty dollars in cash to the merchant device 212. Based on this, the unallocated non-cash total is reduced by twenty dollars and the POS module 138 reallocates the unallocated non-cash total (i.e. $80.00) between the first credit card and the second credit card equally. Accordingly, the user interface of the merchant device 212 is updated to show that twenty dollars cash has been received and that half the unallocated non-cash total due ($40.00) is to be charged to the first credit card (i.e. CC1) and to the second credit card (i.e. CC2) if the transaction is executed with no further input.

At 310, the merchant swipes a third payment instrument, a fifteen dollar gift card. Because, in the implementation illustrated, gift cards are considered capped payment instruments, the POS module 138 queries a gift card service associated with the gift card for the balance of the gift card. For example, the POS module 138 may query the card payment network computing device(s) 158 to obtain the balance of the gift card.

FIG. 3B continues the illustration of the process 300 and, in 312, the POS module 138 receives the gift card balance from the gift card service associated with the gift card. The POS module 138 then determines the amount to allocate to the gift card as the lesser of the gift card balance (i.e. a specific allocation) and an equal share of the unallocated non-cash total (i.e. a non-specific allocation). In the illustrated example, the gift card has a balance of fifteen dollars and an equal one-third share of the unallocated non-cash total of eighty dollars is $26.66. As such, the balance of the gift card is determined to be the lesser amount.

At 314, the POS module 138 allocates the gift card balance to the gift card as a specific allocation and reallocates the remaining unallocated non-cash total (i.e. $65.00) between the first credit card and the second credit card. As such, the user interface of the merchant device 212 is updated to show that, if the transaction is executed with no further input, twenty dollars cash has been received, fifteen dollars is allocated to the gift card (i.e. GC) and that half the unallocated non-cash total due ($32.50) is to be charged to the first credit card (i.e. CC1) and to the second credit card (i.e. CC2).

At 316, the merchant 210 enters an adjustment to the cash amount to be applied. In particular, the customer providing the cash requests five dollars in change. Accordingly, the POS module 138 updates the bill splitting arrangement such that fifteen dollars cash is to be applied to the bill, fifteen dollars is specifically allocated to the gift card and the remaining unallocated non-cash total due (i.e. $70) is to be split between the first credit card and the second credit card. As illustrated, the user interface of the merchant device 212 is updated to show that, if the transaction is executed with no further input, fifteen dollars cash is to be applied, fifteen dollars is allocated to the gift card (i.e. GC) and that half the unallocated non-cash total due ($35.00) is to be charged to the first credit card (i.e. CC1) and to the second credit card (i.e. CC2) and five dollars change is to be provided.

At 318, the merchant 210 enters an adjustment to the amount to be applied from the first credit card. For example, the customer associated with the first credit card may indicate that the customer wants at most twenty-five dollars to be charged to the first credit card. As such, the POS module 138 allocates twenty-five dollars to the first credit card as a specific allocation and reallocates the remaining unallocated non-cash total to the second credit card. Accordingly, the user interface of the merchant device 212 is updated to show that, if the transaction is executed with no further input, fifteen dollars cash is to be applied, fifteen dollars is allocated to the gift card (i.e. GC), twenty-five dollars is allocated to the first credit card (i.e. CC1), the remaining unallocated non-cash total ($45.00) is to be charged to the second credit card (i.e. CC2) and five dollars change is to be provided.

At 320, the merchant 210 indicates the bill splitting arrangement has been finalized with the customers and the POS module 138 conducts the transaction with the card payment network and user interface of the merchant device 212 outputs a completion message.

The sequence of operations described above is only an example provided for discussion purposes. For example, the implementation discussed above divided non-cash payment instruments into capped and non-capped instruments. In particular, instruments classified as uncapped (e.g. credit cards) were assumed to have no cap on the amount that can be charged thereto while instruments classified as capped were assumed to have a cap on the amount that can be charged thereto. As such, the cap is determined for capped instruments to determine the amount to be allocated thereto. In other implementations, different classification schemes or classifications for different types of instruments may be made or all payment instruments may be treated as capped or uncapped instruments. Numerous other variations are possible. Further, the payment instruments provided above did not include electronic payments from the payment service of the computing devices 112. An example for handling such payments is described below with regard to FIG. 4.

FIG. 4 is a flow diagram illustrating an example process 400 for handling the bill splitting operations disclosed herein. The following actions described with respect to FIG. 4 may be performed by the merchant device(s) 108 as shown in FIG. 1 and may be used in the context of FIGS. 2-3B.

At 402, the merchant 210 enters items purchased by the customers into the merchant device 212 and the POS module 138 determines the total due from the customers. At this point, the total due is also the unallocated non-cash total. At 404, the POS module 138 causes the user interface displayed by the merchant device to output the current bill splitting arrangement (if any). The user interface may vary from implementation to implementation and may, for example, be similar to that shown in FIG. 3. At 406, the POS module 138 receives input from the merchant.

At 408, the type of input is determined. In the example process 400, the POS module 138 determines if the input is the addition of a payment instrument, an adjustment of the bill splitting allocation or an indication that the bill splitting arrangement is complete and should be executed. If the input is the addition of a payment instrument, the process proceeds to 410. If the input is an adjustment of the bill splitting arrangement, the process proceeds to 412. If the input is an indication that the bill splitting arrangement is complete, the process proceeds to 414.

At 410, a determination is made of the general type of the payment instrument to be added. In the example process 400, the POS module 138 determines if the payment instrument is cash, a payment card or an electronic payment through a payment service. If the payment instrument is cash, the process proceeds to 416. If the payment instrument is a payment card, the process proceeds to 418. If the payment instrument is an electronic payment through a payment service, the process proceeds to 420.

At 416, the POS module 138 subtracts the cash amount from the unallocated non-cash total which is to be split between payment instruments on the non-specific allocation list. The process then continues to 422. At 422, the POS module 138 reallocates the unallocated non-cash total among payment instruments on the non-specific allocation list. Subsequent to 422, the process returns to 404.

At 418, the payable type of the payment instrument is determined. In the illustrated example process 400, the POS module 138 determines if the payment instrument is classified as a capped instrument (e.g. a gift card) or an uncapped instrument (e.g. a credit card). If the payment instrument is classified as a capped payable type of instrument, the process proceeds to 424. If the payment instrument is classified as an uncapped payable type of instrument, the process proceeds to 426.

At 424, the POS module 138 queries a service for the instrument balance of the payment instrument to be added. For example, for a gift card, a gift card service may be queried for the balance of the gift card. In the example illustrated in FIG. 4, the instrument balance may be the maximum amount that can be charged to the payment instrument. For example, in implementations in which other instruments, such as debit cards, are treated as capped instruments, the appropriate service may be queried for account balance of the account associated with the debit card. The process may then continue to 428.

At 428, the POS module 138 may determine if the instrument balance is less than an equal share of the unallocated non-cash total. At 430, the POS module 138 determines how to treat the payment instrument based on the determination at 428.

In some implementations, the determinations of the equal share of the unallocated non-cash total in 428-430 may determine if other capped payment instruments previously allocated their instrument balance (e.g. because the instrument balance was less than an equal share at the previous time) may be moved to the non-specific allocation list due the reduction in the amount of an equal share resulting from the addition of another payment instrument. For example, in a scenario in which two credit cards and a $40 gift card are presented to pay a bill for $140, because the gift card cannot cover an even share (one third of $140). Instead, the bill splitting operations allocate $40 to the gift card and the two credit cards would split the remaining $100. But, if another credit card is swiped, the gift card should be moved to the non-specific allocation list because a fourth of $140 is less than $40. Where payment instruments allocated their instrument balance are determined to be movable (i.e. able to be allocated an equal share) are moved to the non-specific allocation list and the unallocated non-cash total is adjusted accordingly. Similar operations may be performed at 422 (e.g. following the addition or increase of an amount of cash provided or an adjustment that decreases the amount of an equal share of the unallocated non-cash total at 434).

If the instrument balance is less than an equal share of the unallocated non-cash total, the process continues to 432. Otherwise, the process continues to 426.

At 432, the payment instrument is added as a specific allocation instrument and allocated its instrument balance as a specific allocation. In turn, the unallocated non-cash total is reduced by the instrument balance.

At 426, the payment instrument is added to the non-specific allocation list as a non-specific allocation instrument. The process then continues to 422.

Returning to 420 (which may be reached when the instrument type is determined to be an electronic payment using the payment service of the computing devices 112), the POS module 138 queries the payment service for the payable type associated with the electronic payment (e.g. whether the electronic payment should be treated as capped or uncapped). For example, if the electronic payment is made from a user account with the payment service that has a prepaid balance, the electronic payment may be determined to be of the capped type with a subsequently determined instrument balance equal to the remainder of the prepaid value. On the other hand, if the electronic payment is made from a user account with the payment service using a credit card associated with the account, the electronic payment may be determined to be of the uncapped type. Once the handling of the electronic payment is determined, the process continues to 418 and continues as described above.

Returning to 412 (which may be reached when the input type is determined to be an allocation adjustment input), the POS module 138 receives an indication of the instrument to receive the allocation adjustment. The process then continues to 434.

At 434, if the identified instrument is currently on the non-specific allocation list, the identified instrument may be removed from the non-specific allocation list. The POS module 138 then allocates the amount indicated by the allocation adjustment input by the merchant 210 to the identified payment instrument. If the amount to be allocated to the identified payment instrument is less than previously allocated to the instrument, the POS module 138 may set the capped instruments on the non-specific allocation list to be reprocessed. Specifically, because the unallocated non-cash total has increased, the equal share allocated to such capped instruments may exceed the instruments balances thereof. The process may then continue to 422.

Returning to 414 (which may be reached when the merchant indicates the bill splitting arrangement is complete), the merchant device attempts to execute the transaction. For example, the merchant device may interact with the card payment network(s), bank computing device(s), payment service(s), and so on associated with the payment instruments to execute the transaction. More particularly, some implementations may allow the merchant to obtain a signature from the customers associated with the payment instruments to be processed either, perform an authorization operations with the card payment network, and print receipt(s) for the customers. The signature/authorization/receipt process may be performed serially (e.g. obtain one signature, authorize the associated payment instrument and print receipt and repeat for each additional instrument) or in parallel (e.g. obtain a plurality of signatures, authorize the associated payment instrument(s) and print receipts).

The process 400 described above is only an example provided for discussion purposes. For example, the determinations at 408, 410 and 418 are merely examples and other or additional determinations or options may be included in other implementations. In a particular example variation, additional types of payment instruments may be added to the determination at 410 and similar handling may be provided for the additional types of payment instruments. In another example variation, some implementations may provide for the option to exit from the bill splitting operation temporarily to execute the payment transaction for one or more of the payment instruments before returning to the bill splitting operation for the remaining payment instruments. For example, some implementations may allow the merchant to obtain a signature from the customer associated with the payment instrument to be processed, perform an authorization operation with the card payment network, and print a receipt for the customer before returning to the bill splitting operation for the remaining payment instruments.

In addition, some implementations may provide for various methods of weighting the division of the unallocated portion of the payment. For example, in some such implementations, payment instruments may be input multiple times (e.g. swiped multiple times) and the bill splitting may be weighted based on the number of times the various payment methods are input. Numerous other variations are possible.

As previously stated, each of the above discussed scenarios is merely an example and many variations are possible. Moreover, many variations of the techniques discussed above are possible as well without departing from the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A mobile point-of-sale (POS) device for receiving payment for a cost of a transaction, the mobile POS device comprising:
   a display;
   a reader to receive a payment instrument;
   one or more processors; and
   one or more computer-readable media storing computer-executable instructions that, when executed on the one or more processors, cause the one or more processors to perform acts comprising:
      receiving, via a user interface (UI) presented on the display, an input indicating that a portion of the cost of the transaction has been received in cash and an amount of change to be returned;
      causing, based at least in part on receiving the input, the display to update the UI to indicate a remaining cost of the transaction, the remaining cost of the transaction comprising the cost of the transaction less the portion received in cash;
      receiving, from the reader, first data associated with a first payment instrument;
      causing, based at least in part on receiving the first data, the display to update the UI to indicate that the first payment instrument is to satisfy the remaining cost of the transaction;
      receiving, from the reader, second data associated with a second payment instrument;
      causing, based at least in part on receiving the second data, the display to update the UI to indicate that the remaining cost of the transaction is to be approximately split into halves between the first payment instrument and the second payment instrument and that the amount of change is to be returned;
      receiving a request to process the first payment instrument and the second payment instrument for the remaining cost of the transaction; and
      processing the first payment instrument and the second payment instrument in parallel, the processing comprising:
         receiving a second indication that a first signature has been acquired with respect to the first payment instrument and a second signature has been acquired with respect to the second payment instrument; and in response to receiving the second indication, submitting an authorization request for the first payment instrument for approximately half of the total cost of the transaction and the second payment instrument for approximately half of the total cost of the transaction.

2. The system as recited in claim 1, wherein the input comprises a first input, the portion of the cost comprises a first portion of the cost, and the acts further comprising:

receiving, from the reader, third data associated with a third payment instrument;

causing, based at least in part on receiving the third data, the display to update the UI to indicate that the remaining cost of the transaction is to be approximately split into thirds between the first payment instrument, the second payment instrument, and the third payment instrument;

receiving, via the UI presented on the display, a second input indicating that the third payment instrument is to satisfy a second portion of the cost of the transaction;

causing, based at least in part on receiving the second input, the display to update the UI to indicate that the remaining cost of the transaction is to be approximately split into halves between the first payment instrument and the second payment instrument, wherein the remaining cost of the transaction is the cost of the transaction less the first portion received in cash and the second portion to be satisfied by the third payment instrument; and attempting to authorize the third payment instrument for the second portion of the cost of the transaction.

3. The system as recited in claim 1, the acts further comprising:

receiving, via the UI presented on the display, a second input indicating that the portion of the cost of the transaction that has been received in cash is to be adjusted and the first amount of change is to be returned;

increasing the remaining cost of the transaction by the first amount of change; and causing, based at least in part on receiving the second input, the display to update the UI to indicate that the remaining cost of the transaction is to be approximately split into halves between the first payment instrument and the second payment instrument and the first amount of change is to be returned.

4. The system as recited in claim 1, the acts further comprising:

receiving, from the reader, third data associated with a third payment instrument;

determining the third payment instrument is a gift card;

requesting a balance of the gift card;

determining that the balance of the gift card is less than a share of the remaining cost of the transaction approximately split between the first payment instrument, the second payment instrument, and the gift card;

decreasing, based at least in part on determining that the balance of the gift card is less than the share, the remaining cost of the transaction by the balance of the gift card;

causing, based at least in part on determining that the balance of the gift card is less than the share, the display to update the UI to indicate that the remaining cost of the transaction is to be approximately split into halves between the first payment instrument and the second payment instrument, and the gift card is to satisfy an amount equal to the balance of the gift card; and attempting to authorize the third payment instrument for the amount equal to the balance of the gift card.

5. The system as recited in claim 1, the acts further comprising:

receiving, from the reader, third data associated with a third payment instrument;

determining the third payment instrument is a gift card;

requesting a balance of the gift card;

determining that the balance of the gift card is greater than or equal to a share of the remaining cost of the transaction approximately split between the first payment instrument, the second payment instrument, and the gift card;

causing, based at least in part on determining that the balance of the gift card is greater than or equal to the share, the display to update the UI to indicate that the remaining cost of the transaction is to be approximately split into halves between the first payment instrument and the second payment instrument, and the gift card is to satisfy an amount equal to the balance of the gift card; and attempting to authorize the third payment instrument for the share.

6. One or more non-transitory computer-readable media storing instructions executable by one or more processors, wherein the instructions program the one or more processors to implement a service to perform acts comprising:

causing a display to present a user interface (UI) indicating a total cost of a transaction;

receiving first data associated with a first payment instrument;

receiving second data associated with a second payment instrument;

causing, based at least in part on receiving the first data and the second data, the display to present a first indication that the total cost of the transaction is to be approximately split between the first payment instrument and the second payment instrument; and processing the first payment instrument and the second payment instrument in parallel, the processing comprising:

receiving a second indication that a first signature has been acquired with respect to the first payment instrument and a second signature has been acquired with respect to the second payment instrument; and in response to receiving the second indication, attempting to authorize the first payment instrument for approximately half of the total cost of the transaction and the second payment instrument for approximately half of the total cost of the transaction.

7. The one or more non-transitory computer-readable media as recited in claim 6, the acts further comprising:

receiving, via the UI presented on the display, an input indicating that a portion of the total cost of the transaction has been received in cash;

decreasing, based at least in part on receiving the input, an unallocated portion of the total cost of the transaction by the portion of the cost of the transaction received in cash; and causing, based at least in part on receiving the first input, the display to update the UI to indicate that the portion of the total cost of the transaction received in cash is to be satisfied by a cash payment and the unallocated portion of the total cost of the transaction is to be approximately split between the first payment instrument and the second payment instrument.

8. The one or more non-transitory computer-readable media as recited in claim 7, the acts further comprising:
receiving, via the UI presented on the display, a second input indicating that the portion of the total cost of the transaction to be satisfied by the cash payment is to be adjusted and that a specified amount of change is to be returned;
increasing, based at least in part on receiving the second input, the unallocated portion of the total cost of the transaction by the specified amount of change; and
causing, based at least in part on receiving the second input, the display to update the UI to indicate that the increased unallocated portion of the total cost of the transaction is to be approximately split between the first payment instrument and the second payment instrument and the specified amount of change is to be returned.

9. The one or more non-transitory computer-readable media as recited in claim 6, the acts further comprising:
receiving third data associated with a third payment instrument;
determining that the third payment instrument is a capped payment instrument;
determining a balance of the capped payment instrument;
determining that the balance of the capped payment instrument is less than a share of an unallocated portion of the total cost of the transaction approximately split between the first payment instrument, the second payment instrument and the capped payment instrument;
decreasing, based at least in part on determining that the balance of the capped payment instrument is less than the share, the unallocated portion of the total cost of the transaction by the balance of the capped payment instrument;
causing, based at least in part on determining that the instrument balance of the capped payment instrument is less than the share, the display to update the UI to indicate that the unallocated portion of the total cost of the transaction is to be approximately split between the first payment instrument and the second payment instrument, and the capped payment instrument is to satisfy an amount equal to the balance of the capped payment instrument; and
attempting to authorize the capped payment instrument for the amount equal to the balance of the capped payment instrument.

10. The one or more non-transitory computer-readable media as recited in claim 6, the acts further comprising:
receiving third data associated with a third payment instrument;
determining that the third payment instrument is a capped payment instrument;
determining a balance of the capped payment instrument;
determining that the balance of the capped payment instrument is greater than or equal to a share of an unallocated portion of the total cost of the transaction approximately split between the first payment instrument, the second payment instrument, and the capped payment instrument; and
causing, based at least in part on determining that the balance of the capped payment instrument is greater than or equal to the share, the display to update the UI to indicate that the unallocated portion of the total cost of the transaction is to be approximately split between the first payment instrument, the second payment instrument, and the capped payment instrument.

11. The one or more non-transitory computer-readable media as recited in claim 6, the acts further comprising:
receiving, via the UI presented on the display, an input indicating that a portion of the total cost of the transaction has been received in cash and a specified amount of change is to be returned;
increasing, based at least in part on receiving the input, an unallocated portion of the total cost of the transaction by the specified amount of change;
determining that a balance of a capped payment instrument is less than a share of the unallocated portion of the total cost of the transaction approximately split between the first payment instrument, the second payment instrument, and the capped payment instrument;
decreasing, based at least in part on determining that the balance of the gift card is less than the share, the unallocated portion of the total cost of the transaction by the instrument balance of capped payment instrument;
causing, based at least in part on determining that the instrument balance of the capped payment instrument is less than the share, the display to update the UI to indicate that the unallocated portion of the total cost of the transaction is to be approximately split between the first payment instrument and the second payment instrument, and the capped payment instrument is to satisfy an amount equal to the instrument balance of the capped payment instrument; and
attempting to authorize the capped payment instrument for the amount equal to the instrument balance of the capped payment instrument.

12. The one or more non-transitory computer-readable media as recited in claim 6, wherein the first data is received via at least one of a card reader or a customer device via a network interface.

13. The one or more non-transitory computer-readable media as recited in claim 6, the acts further comprising:
receiving third data associated with a third payment instrument;
causing, based at least in part on receiving the first data, the second data, and the third data, the display to update the UI to indicate that an unallocated portion of the total cost of a transaction is to be approximately split between the first payment instrument, the second payment instrument, and the third payment instrument;
receiving, via the user interface (UI) presented on the display, an input indicating that a specified portion of the total cost of the transaction is to be satisfied by the third payment instrument;
attempting to authorize the third payment instrument for the specified portion of the cost of the transaction;
decreasing, based at least in part on receiving the input, the unallocated portion of the total cost of the transaction by the specified portion of the cost of the transaction; and
causing, based at least in part on receiving the input, the display to update the UI to indicate that the specified portion of the total cost of the transaction has been satisfied by the third payment instrument and the unallocated portion of the total cost of the transaction is to be approximately split between the first payment instrument and the second payment instrument.

14. The one or more non-transitory computer-readable media as recited in claim 6, wherein the processing is based at least in part on no additional payment instruments being received within a threshold amount of time after the second data associated with the second payment instrument is received.

15. A method comprising:
   causing a display to present a user interface (UI) indicating a total cost of a transaction;
   receiving first data associated with a first payment instrument;
   receiving second data associated with a second payment instrument;
   receiving third data associated with a third payment instrument;
   causing, based at least in part on receiving the first data, the second data, and the third data, the display to present a first indication that the total cost of the transaction is to be approximately split between the first payment instrument, the second payment instrument, and the third payment instrument;
   receiving, via the UI, an input indicating that a specified portion of the total cost of the transaction is to be satisfied by the third payment instrument;
   allocating the specified portion of the total cost of the transaction to the third payment instrument;
   decreasing, based at least in part on receiving the input, an unallocated portion of the total cost of the transaction by the specified portion of the total cost of the transaction; and
   processing the first payment instrument, the second payment instrument, and the third payment instrument in parallel, the processing comprising:
      receiving a second indication that a first signature has been acquired with respect to the first payment instrument, a second signature has been acquired with respect to the second payment instrument, and a third signature has been acquired with respect to the third payment instrument; and
      in response to receiving the second indication, attempting to authorize the first payment instrument for approximately half of the unallocated portion of the total cost, the second payment instrument for approximately half of the unallocated portion of the total cost, and the third payment instrument for the specified portion of the total cost.

16. The method as recited in claim 15, further comprising causing, based at least in part on receiving the input, the display to update the UI to indicate that the specified portion of the total cost of the transaction is to be satisfied by the third payment instrument and the unallocated portion of the total cost of the transaction is to be approximately split between the first payment instrument and the second payment instrument.

17. The method as recited in claim 15, wherein the input comprises a first input, and further comprising:
   receiving, via the UI presented on the display, a second input indicating that a portion of the total cost of the transaction has been received in cash;
   decreasing, based at least in part on receiving the second input, the unallocated portion of the total cost of the transaction by the portion of the total cost of the transaction received in cash; and
   causing, based at least in part on receiving the second input, the display to update the UI to indicate that:
      the portion of the total cost of the transaction received in cash is to be satisfied by cash payment,
      the specified portion of the total cost of the transaction is to be satisfied by the third payment instrument, and
      the unallocated portion of the total cost of the transaction is to be approximately split between the first payment instrument and the second payment instrument.

18. The method as recited in claim 17, further comprising:
   receiving, via the UI, a third input indicating that the portion of the total cost of the transaction to be satisfied by cash payment is to be adjusted and a specified amount of change is to be returned;
   increasing, based at least in part on receiving the third input, the unallocated portion of the total cost of the transaction by the specified amount of change; and
   causing, based at least in part on receiving the third input, the display to update the UI to indicate that the unallocated portion of the cost of the transaction is to be approximately split between the first payment instrument and the second payment instrument and the specified amount of change is to be returned.

19. The method as recited in claim 15, further comprising:
   determining that the second payment instrument is a capped payment instrument;
   determining the balance of the second payment instrument;
   determining, based at least in part on the input indicating that the specified portion of the total cost of the transaction is to be satisfied by the third payment instrument, that the balance is greater than or equal to a share of the unallocated portion of the cost of the transaction approximately split between the first payment instrument and the second payment instrument; and
   causing, based at least in part on determining that the balance is greater than or equal to share, the display to update the UI to indicate that the unallocated portion of the total cost of the transaction is to be approximately split between the first payment instrument and the second payment instrument.

20. The method as recited in claim 15, further comprising:
   determining that the second payment instrument is a capped payment instrument;
   determining the balance of the second payment instrument;
   determining, based at least in part on the input indicating that the specified portion of the total cost of the transaction is to be satisfied by the third payment instrument, that the balance is less than a share of the remaining cost of the transaction approximately split between the first payment instrument and the second payment instrument;
   decreasing, based at least in part on determining that the balance is less than the share, the remaining cost of the transaction by the balance of the gift card; and
   causing, based at least in part on determining that the balance of the gift card is less than the share, the display to update the UI to indicate that the unallocated portion of the total cost of the transaction is to be satisfied by the first payment instrument and the second payment instrument is to satisfy an amount equal to the instrument balance.

* * * * *